US011905662B2

(12) United States Patent
Fukunaga et al.

(10) Patent No.: US 11,905,662 B2
(45) Date of Patent: Feb. 20, 2024

(54) PAPER BARRIER MATERIAL

(71) Applicants: NIPPON PAPER INDUSTRIES CO., LTD., Tokyo (JP); JUJO THERMAL OY, Kauttua (FI)

(72) Inventors: Masaaki Fukunaga, Tokyo (JP); Hiroshi Koyamoto, Tokyo (JP); Yuri Oishi, Tokyo (JP); Masatsugu Kato, Tokyo (JP); Akio Miyajima, Tokyo (JP); Masashi Okamoto, Kauttua (FI)

(73) Assignees: NIPPON PAPER INDUSTRIES CO., LTD., Tokyo (JP); JUJO THERMAL OY, Kauttua (FI)

( * ) Notice: Subject to any disclaimer, the term of this patent is extended or adjusted under 35 U.S.C. 154(b) by 212 days.

(21) Appl. No.: 17/427,884

(22) PCT Filed: Mar. 17, 2020

(86) PCT No.: PCT/JP2020/011632
§ 371 (c)(1),
(2) Date: Aug. 2, 2021

(87) PCT Pub. No.: WO2020/189663
PCT Pub. Date: Sep. 24, 2020

(65) Prior Publication Data
US 2022/0120038 A1    Apr. 21, 2022

(30) Foreign Application Priority Data

Mar. 18, 2019  (JP) ................................ 2019-049712

(51) Int. Cl.
D21H 19/84    (2006.01)
B65D 65/40    (2006.01)
D21H 19/36    (2006.01)

(52) U.S. Cl.
CPC ............ *D21H 19/84* (2013.01); *B65D 65/40* (2013.01); *D21H 19/36* (2013.01)

(58) Field of Classification Search
CPC ......... B32B 27/10; B32B 27/20; B65D 65/40; D21H 19/84
USPC ....................................................... 162/137
See application file for complete search history.

(56) References Cited

U.S. PATENT DOCUMENTS

| 6,942,919 B2 | 9/2005 | Tokiyoshi et al. |
| 2006/0068212 A1 | 3/2006 | Wilhoit et al. |
| 2010/0310883 A1 | 12/2010 | Brungardt |
| 2011/0293957 A1 | 12/2011 | Johansson et al. |
| 2013/0101831 A1 | 4/2013 | Knoerzer et al. |
| 2017/0087810 A1 | 3/2017 | Schuman et al. |
| 2019/0270289 A1 | 9/2019 | Okamoto et al. |

FOREIGN PATENT DOCUMENTS

| EP | 3437860 A1 | 2/2019 |
| JP | H0559692 A | 3/1993 |
| JP | 2009233924 A | 10/2009 |
| JP | 2010173111 A | 8/2010 |
| JP | 2011052342 A | 3/2011 |
| JP | 5331265 B1 | 10/2013 |
| JP | 2014113774 A | 6/2014 |
| JP | 2015134980 A | 7/2015 |
| JP | 2017515754 A | 6/2017 |
| JP | 2017124851 A | 7/2017 |
| JP | 6234654 B1 | 11/2017 |
| WO | 02090206 A1 | 11/2002 |
| WO | 2014181560 A1 | 11/2014 |
| WO | 2015140097 A1 | 9/2015 |

OTHER PUBLICATIONS

Extended European Search Report (EESR) dated Nov. 17, 2022, issued for European counterpart patent application No. EP20773798.2 (12 pages).
An Examination report under sections 12 & 13 of the Patents Act, 1970 and the Patents Rules, 2003 issued by Indian Intellectual Property Office, dated Feb. 22, 2023, for Indian counterpart application No. 202117045251 (6 pages).
International Preliminary Report on Patentability, dated Sep. 16, 2021, for corresponding international application PCT/JP2020/011632 (1 page).
Notification Concerning Transmittal of International Preliminary Report on Patentability, dated Sep. 30, 2021, for corresponding international application PCT/JP2020/011632 (1 page).
Notification of Transmittal of Translation of the International Preliminary Report on Patentability, dated Sep. 30, 2021, for corresponding international application PCT/JP2020/011632 (1 page).
Written Opinion of the International Searching Authority, dated Jun. 9, 2020, for corresponding international application PCT/JP2020/011632 (3 page).
A First Examination Report issued by the Australian Intellectual Property Office dated May 4, 2022 for Australian counterpart application No. 2020241935 (9 pages).
International Search Report (ISR) dated Jun. 9, 2020, issued for International application No. PCT/JP2019/011632. (2 pages).

*Primary Examiner* — Mark Halpern
(74) *Attorney, Agent, or Firm* — Law Office of Katsuhiro Arai

(57) ABSTRACT

An object is to provide a paper barrier material resistant to fractures due to water vapor expansion when heated. As a solution, a paper barrier material is provided, which is characterized in that it comprises a gas barrier layer, a seal layer, a paper base material, and a pigment coating layer, being stacked in this order, wherein the laminate consisting only of the paper base material and pigment coating layer has an air permeation resistance of 2,500 seconds or lower as measured based on JAPAN TAPPI No. 5-2: 2000.

4 Claims, No Drawings

PAPER BARRIER MATERIAL

CROSS-REFERENCE TO RELATED APPLICATIONS

This application is the U.S. National Phase under 35 U.S.C. § 371 of International Application PCT/JP2020/011632, filed Mar. 17, 2020, which claims priority to Japanese Patent Application No. JP2019-049712, filed Mar. 18, 2019. The International Application was published under PCT Article 21(2) in a language other than English.

TECHNICAL FIELD

The present invention relates to a paper barrier material.

BACKGROUND ART

Adding gas barrier property (particularly oxygen barrier property) to paper packaging materials is important from the viewpoint of protecting the various products to be packaged from deterioration due to gases, such as oxidation due to oxygen. As paper barrier materials having gas barrier property, paper barrier materials comprising a paper base material on which a water vapor barrier layer and a gas barrier layer are provided, are proposed, for example (Patent Literatures 1, 2).

Now, while paper barrier materials are used as product containers, packaging papers and other packaging materials, some packaging materials may be formed by heat-sealing and thus bonding together paper barrier materials that each have a heat-seal layer made of a thermoplastic resin, etc., at least on one side of the paper barrier material. These packaging materials comprising paper barrier materials may have their surfaces printed in various ways to make the product appealing to the consumer, in which case a pigment coating layer to improve printability is oftentimes provided on the printing surface.

When a paper barrier material is heat-sealed, the bonding part and surrounding part are heated to soften the thermoplastic resin, etc., upon which the moisture content inside the paper base material of the paper barrier material is heated and turns into water vapor. If, at this time, the pigment coating layer has high barrier property, the water vapor does not escape from the inside of the paper barrier material where the water vapor may rapidly expand to cause intralaminar fracture or interlaminar fracture. These fractures, should they occur, lead to lower barrier property and reduced exterior appeal.

BACKGROUND ART LITERATURE

Patent Literature

Patent Literature 1: Japanese Patent No. 5331265
Patent Literature 2: Japanese Patent No. 6234654

SUMMARY OF THE INVENTION

Problems to be Solved by the Invention

An object of the present invention is to provide a paper barrier material resistant to fractures due to water vapor expansion when heated.

Means for Solving the Problems

The means for achieving the object of the present invention are as follows:
1. A paper barrier material characterized in that it comprises a gas barrier layer, a seal layer, a paper base material, and a pigment coating layer, being stacked in this order, wherein the laminate consisting only of the paper base material and the pigment coating layer has an air permeation resistance of 2,500 seconds or lower as measured based on JAPAN TAPPI No. 5-2: 2000.
2. The paper barrier material according to 1, characterized in that it has a thermoplastic resin layer on at least one of its outermost surfaces.
3. The paper barrier material according to 1 or 2, characterized in that the laminate consisting only of the paper base material and pigment coating layer has a surface roughness, as measured based on JIS P8151: 2004 using a soft backing under a condition of 1 MPa in clamping pressure, of 3.5 µm or lower.

Effects of the Invention

The paper barrier material proposed by the present invention is such that the laminate consisting only of its paper base material and pigment coating layer has a low air permeation resistance and thus allows gases to escape easily. This means that, even when the paper barrier material proposed by the present invention is rapidly heated in the form of heat-sealing, etc., and the moisture content inside the paper base material is heated and turns into water vapor as a result, intralaminar and interlaminar fractures that would otherwise occur due to rapid expansion of the water vapor can be prevented. Accordingly, lowering of barrier property or reduction in exterior appeal does not occur easily.

Having a thermoplastic resin layer on at least one of its outermost surfaces, the paper barrier material proposed by the present invention does not undergo fractures when heat-sealed, meaning that its quality does not drop easily due to heat-sealing.

The paper barrier material proposed by the present invention exhibits excellent printability because the laminate consisting only of its paper base material and pigment coating layer has a surface roughness, as measured based on JIS P8151: 2004 using a soft backing under a condition of 1 MPa in clamping pressure, of 3.5 µm or lower.

MODE FOR CARRYING OUT THE INVENTION

The paper barrier material proposed by the present invention is characterized in that it comprises a gas barrier layer, a seal layer, a paper base material, and a pigment coating layer, being stacked in this order, wherein the laminate consisting only of the paper base material and pigment coating layer has an air permeation resistance (Oken method) of 2,500 seconds or lower as measured based on JAPAN TAPPI No. 5-2: 2000.

Paper Base Material

The paper base material is obtained by making a paper material containing a pulp, a filler, various auxiliaries, etc.

For the pulp, any of known pulps can be compounded and used as deemed appropriate, such as: needle bleached kraft pulp (NBKP), needle unbleached kraft pulp (NUKP), leaf bleached kraft pulp (LBKP), leaf unbleached kraft pulp (LUKP), sulfite pulp (SP) and other wood chemical pulps; ground pulp (GP), refiner ground pulp (RGP), stone ground pulp (SGP), chemi-ground pulp (CGP), semi-chemical pulp (SCP), thermomechanical pulp (TMP), chemi-thermomechanical pulp (CTMP) and other wood mechanical pulps; non-wood pulps obtained from kenaf, bagasse, bamboo, hemp, straw, etc.; and used paper pulps obtained by removing from used paper, which is used as raw material, any inks contained in the used paper by means of a deinking process. Among these, LBKP, NBKP, and other chemical pulps resistant to mixing-in of foreign objects are preferred, and the compounding quantity of used paper pulp is preferably small. To be specific, preferably the compounding quantity of chemical pulp is 80 percent by mass or higher, or particularly preferably the compounding quantity of chemical pulp is 100 percent by mass.

For the filler, any of known fillers may be used, such as: talc, kaolin, calcined kaolin, clay, ground calcium carbonate, precipitated calcium carbonate, white carbon, zeolite, magnesium carbonate, barium carbonate, titanium dioxide, zinc oxide, silicon oxide, amorphous silica, aluminum hydroxide, calcium hydroxide, magnesium hydroxide, zinc hydroxide, barium sulfate, calcium sulfate, and other inorganic fillers; and urea-formalin resin, polystyrene resin, phenol resin, fine hollow particles, and other organic fillers. It should be noted that the filler is not an essential material and need not be used.

For the various auxiliaries, any auxiliaries may be selected and used as deemed appropriate, where examples can include: rosin, alkyl ketene dimer (AKD), alkenyl succinate anhydride (ASA), or other sizing agent, polyacrylic amide-based polymer, polyvinyl alcohol-based polymer, cationized starch, any of various other modified starches, urea-formalin resin, melamine-formalin resin, or other dry paper strength-enhancing agent, wet paper strength-enhancing agent, yield-improving agent, drainage aids, coagulating agent, aluminum sulfate, bulking agent, dye, fluorescent whitening agent, pH adjuster, defoaming agent, ultraviolet-protective agent, fading inhibitor, pitch-controlling agent, slime-controlling agent, etc.

Pigment Coating Layer

The pigment coating layer is constituted by an inorganic pigment and a binder as primary components. Preferably the mixing ratio of the inorganic pigment and the binder, in the pigment coating layer, is in a range of 90:10 to 80:20 (inorganic pigment:binder) based on ratio of solids content by mass.

The pigment coating layer may use, as necessary and in addition to the pigment and binder, any of various auxiliaries that are compounded in standard coated paper pigments, such as dispersant, viscosity-improving agent, moisture-retention agent, defoaming agent, water-resistant additive, fluorescent dye, coloring dye, coloring pigment, surfactant, pH adjuster, cationic resin, anionic resin, UV-absorbing agent, metal salt, etc.

For the inorganic pigment, any inorganic pigment used for the purpose of compounding into pigment coating layers may be used without any limitation, where examples include precipitated calcium carbonate, ground calcium carbonate, kaolin, calcined kaolin, engineered kaolin, clay, delaminated clay, talc, silica, colloidal silica, calcium sulfate, barium sulfate, titanium dioxide, zinc oxide, zinc sulfide, zinc carbonate, satin white, aluminum silicate, calcium silicate, magnesium silicate, aluminum hydroxide, alumina, magnesium carbonate, magnesium hydroxide, kaolinite, antigorite, smectite, vermiculite, mica, etc. Among these inorganic pigments, precipitated calcium carbonate, ground calcium carbonate, or silica is preferred from the viewpoint of adjustment of air permeation resistance.

For the binder, a binder of any type generally used in the field of coated paper, etc., may be used as deemed appropriate. Examples include: completely saponified polyvinyl alcohol, partially saponified polyvinyl alcohol, acetoacetylated polyvinyl alcohol, carboxy-modified polyvinyl alcohol, amide-modified polyvinyl alcohol, sulfonic acid-modified polyvinyl alcohol, butyral-modified polyvinyl alcohol, olefine-modified polyvinyl alcohol, nitrile-modified polyvinyl alcohol, pyrrolidone-modified polyvinyl alcohol, silicone-modified polyvinyl alcohol and other modified polyvinyl alcohols, ethylene-vinyl alcohol copolymer, and other polyvinyl alcohols, acrylic-based resins and ethylene-acrylic-based resins comprising (meth)acrylic acid or monomer components (other than olefin) that can be copolymerized with (meth)acrylic acid, hydroxyethyl cellulose, methyl cellulose, ethyl cellulose, carboxymethyl cellulose, acetyl cellulose, and other cellulose derivatives, oxidized starch, etherified starch, esterified starch and other starches, styrene-maleic acid anhydride copolymer, styrene-butadiene copolymer, casein, Arabic gum, polyvinyl chloride, polyvinyl acetate, polyacrylamide, polyacrylic acid ester, polyvinyl butyral, polystyrose and copolymers thereof, polyamide resin, silicone-based resin, petroleum resin, terpene resin, ketone resin, coumarone resin, etc. For the binder, any one type may be used alone, or two or more types may be combined.

Seal Layer

The seal layer is designed, when a gas barrier layer is provided, to prevent the coating solution for the gas barrier layer from sinking into the paper base material, thereby preventing the gas barrier property from dropping. The seal layer is not limited in any way, so long as it can demonstrate the aforementioned performance; however, preferably it contains a pigment and a binder. Also, the seal layer may contain a sizing agent, water-resistant additive, water repellant, dye, surfactant, etc., as necessary.

The pigment may be an inorganic pigment such as precipitated calcium carbonate, ground calcium carbonate, kaolin, calcined kaolin, engineered kaolin, clay, delaminated clay, talc, silica, colloidal silica, calcium sulfate, barium sulfate, titanium dioxide, zinc oxide, zinc sulfide, zinc carbonate, satin white, aluminum silicate, calcium silicate, magnesium silicate, aluminum hydroxide, alumina, magnesium carbonate, magnesium hydroxide, kaolinite, antigorite, smectite, vermiculite, or mica, or it may be an organic pigment constituted by acrylic-based or methacrylic-based resin, vinyl chloride-based resin, vinyl acetate-based resin, polyester-based resin, styrene-acrylic-based resin, styrene-butadiene-based resin, styrene-isoprene-based resin, polycarbonate-based resin, silicone-based resin, urea resin, melamine-based resin, epoxy-based resin, phenol-based resin, diallyl phthalate-based resin, or other resin, for example. For the pigment, any one type selected from the above may be used alone, or two or more types may be combined.

Water vapor barrier property can be added to the seal layer by using an inorganic pigment having a flat shape. When adding water vapor barrier property to the seal layer, preferably an inorganic pigment whose volume 50% average grain size (D50) (hereinafter also referred to as "average grain size") is 5 μm or greater and aspect ratio is 10 or greater, is used alone or two or more types of such inorganic pigments are combined, as the pigment. The flat pigment(s) is/are not limited in any way, and kaolin, calcined kaolin, engineered kaolin, clay, delaminated clay, talc, mica, etc., may be used.

For the binder, a binder of any type generally used in the field of coated paper, etc., may be used as deemed appropriate. Examples include: completely saponified polyvinyl alcohol, partially saponified polyvinyl alcohol, acetoacetylated polyvinyl alcohol, carboxy-modified polyvinyl alcohol, amide-modified polyvinyl alcohol, sulfonic acid-modified polyvinyl alcohol, butyral-modified polyvinyl alcohol, olefine-modified polyvinyl alcohol, nitrile-modified polyvinyl alcohol, pyrrolidone-modified polyvinyl alcohol, silicone-modified polyvinyl alcohol, and other modified polyvinyl alcohols, ethylene-vinyl alcohol copolymer and other polyvinyl alcohols, acrylic-based resins and ethylene-acrylic-based resins comprising (meth)acrylic acid or monomer components (other than olefin) that can be copolymerized with (meth)acrylic acid, hydroxyethyl cellulose, methyl cellulose, ethyl cellulose, carboxymethyl cellulose, acetyl cellulose, and other cellulose derivatives, oxidized starch, etherified starch, esterified starch, and other starches, styrene-maleic acid anhydride copolymer, styrene-butadiene copolymer, casein, Arabic gum, polyvinyl chloride, polyvinyl acetate, polyacrylamide, polyacrylic acid ester, polyvinyl butyral, polystyrose, and copolymers thereof, polyamide resin, silicone-based resin, petroleum resin, terpene resin, ketone resin, coumarone resin, etc. For the binder, any one type selected from the above may be used alone, or two or more types may be combined.

Water vapor barrier property can be added to the seal layer by using a binder having high water vapor barrier property. When adding water vapor barrier property to the seal layer, preferably one type selected from among ethylene-vinyl alcohol copolymer, ethylene-acrylic-based resin, and styrene-butadiene copolymer is used, or two or more types may be combined, as the binder.

The compounding quantity of the pigment to be used in the seal layer is preferably in a range of 1 part by weight or greater but no greater than 1,000 parts by weight, or more preferably 10 parts by weight or greater but no greater than 500 parts by weight, relative to 100 parts by weight of the binder based on dry weight.

Gas Barrier Layer

Under the present invention, examples of water-soluble polymers that may be used in the gas barrier layer include: completely saponified polyvinyl alcohol, partially saponified polyvinyl alcohol, ethylene copolymer polyvinyl alcohol, and other polyvinyl alcohols; casein, soybean protein, synthetic protein, and other proteins; oxidized starch, cationized starch, urea phosphoric acid esterified starch, hydroxyethyl etherified starch, and other starches; carboxymethyl cellulose, hydroxymethyl cellulose hydroxyethyl cellulose, and other cellulose derivatives; polyvinyl pyrrolidone, sodium alginate, etc. Among these, polyvinyl alcohols and cellulose derivatives are preferred, while polyvinyl alcohols are more preferred, from the viewpoint of gas barrier property. Also, water-dispersible resins include polyvinylidene chloride, modified polyolefin-based resin, etc.

Under the present invention, preferably a pigment is contained in the gas barrier layer from the viewpoint of improving the gas barrier property. Pigments that may be used in the gas barrier layer include, for example, kaolin, clay, engineered kaolin, delaminated clay, ground calcium carbonate, precipitated calcium carbonate, mica, talc, titanium dioxide, barium sulfate, calcium sulfate, zinc oxide, silicic acid, salt of silicic acid, colloidal silica, satin white, and other inorganic pigments, as well as solid-type, hollow-type, core-shell-type, and other organic pigments, any of which may be used alone, or two or more types may be mixed.

If a pigment is contained in the gas barrier layer under the present invention, the compounding quantity of the pigment to be used is preferably in a range of 1 part by weight or greater but no greater than 1,000 parts by weight, relative to 100 parts by weight of the water-soluble polymer based on dry weight. It should be noted that, under the present invention, the pigment, before it is compounded into the water-soluble polymer, is preferably made into a slurry and then mixed.

Furthermore, under the present invention, the gas barrier layer may use various auxiliaries that are normally used, such as dispersant, thickening agent, moisture-retention agent, defoaming agent, water-resistant additive, dye, fluorescent dye and crosslinking agent, in addition to the water-soluble polymer and pigment.

[Paper Barrier Material]

The paper barrier material proposed by the present invention is characterized in that it comprises a gas barrier layer, a seal layer, a paper base material, and a pigment coating layer, being stacked in this order, wherein the laminate consisting only of two of these—the paper base material and pigment coating layer—has an air permeation resistance, as measured based on JAPAN TAPPI No. 5-2: 2000 (Paper and Board—Determination of Smoothness and Air Permeance—Oken Method), of 2,500 seconds or lower. Because its air permeation resistance as described above is 2,500 seconds or lower, the paper barrier material proposed by the present invention is resistant to intralaminar and interlaminar fractures in the paper barrier material even when water vapor expands inside due to rapid heating. This air permeation resistance is preferably 2,200 seconds or lower, or more preferably 1,800 seconds or lower, or yet more preferably 1,500 seconds or lower.

Also, the paper barrier material proposed by the present invention has a surface roughness of the laminate consisting only of the paper base material and pigment coating layer, as measured based on JIS P8151: 2004 using a soft backing under a condition of 1 MPa in clamping pressure, of preferably 3.5 µm or lower, or more preferably 3.0 µm or lower, from the viewpoint of printability.

Thermoplastic Resin Layer

The paper barrier material proposed by the present invention may have a thermoplastic resin layer on at least one of its outermost surfaces. The paper barrier material having a thermoplastic resin layer may be formed into packaging materials of various shapes by heat-sealing and thus bonding the thermoplastic resin layer. If a thermoplastic resin layer is provided only on one side of the paper barrier material, it may be provided on either the surface on the gas barrier layer side or surface on the pigment coating layer side. Preferably thermoplastic resin layers are provided on both of the outermost surfaces of the paper barrier material. The paper barrier material having thermoplastic resin layers on both of its outermost surfaces permits easy heat-sealing and bonding that also ensures strength.

[Method for Manufacturing Paper Barrier Material]

The paper barrier material proposed by the present invention may be manufactured by coating and then drying one by one on the paper base material the coating solutions with which to form the pigment coating layer, seal layer, and gas barrier layer. The method for manufacturing the paper base material (papermaking) and type of paper machine are not limited in any way, and a Fourdrinier paper machine, cylinder paper machine, Tanmo paper machine, twin-wire paper machine of gap former, hybrid former (on-top former), or other type, or other known manufacturing (papermaking) method/paper machine can be selected. Also, the papermaking pH level may be in the acidic region (acidic papermaking), pseudo-neutral region (pseudo-neutral papermaking), neutral region (neutral papermaking), or alkaline region (alkaline papermaking), and an alkaline chemical may also be applied on the paper layer surface after the papermaking has been performed in the acidic region. In addition, the paper base material may comprise one layer, or multiple layers of two or more.

The basis weight of the paper base material is not limited in any way, but it is normally around 20 g/m$^2$ or higher but no higher than 600 g/m$^2$. The paper base material can have its basis weight selected as deemed appropriate according to the purpose of use of the paper barrier material, etc., and in the case of a packaging material for food, etc., or bag, paper container, cardboard box, cup, or other packaging material used for the purpose of packaging, a basis weight of 25 g/m$^2$ or higher but no higher than 600 g/m$^2$ is more preferred. Furthermore, the basis weight may be set to 30 g/m$^2$ or higher but no higher than 150 g/m$^2$ in the case of a bag or soft packaging material application, or 170 g/m$^2$ or higher but no higher than 600 g/m$^2$ in the case of a paper container application, for example.

The method for coating the pigment coating layer, seal layer, and gas barrier layer is not limited in any way, and they may be coated using any known coating device and coating system. For example, the coating device may be a blade coater, bar coater, air-knife coater, curtain coater, spray coater, roll coater, reverse roll coater, size press coater, gate roll coater, etc. Also, the coating system may be water-based coating that uses water or other medium, solvent-based coating that uses an organic solvent or other medium, or the like.

Regarding the method for drying the pigment coating layer, seal layer, and gas barrier layer, any standard method may be used, such as a steam heater, gas heater, infrared heater, electrical heater, hot-air heater, microwave, or cylinder dryer, for example.

Preferably the coating weight of the pigment coating layer is 5 g/m$^2$ or higher but no higher than 15 g/m$^2$ based on dry weight. If the coating weight is under 5 g/m$^2$, the improvement in printability may not be sufficient. If the coating weight exceeds 15 g/m$^2$, on the other hand, the air permeation resistance of the laminate consisting only of the paper base material and pigment coating layer will not likely fall within the range specified by the present invention.

Preferably the coating weight of the seal layer is 3 g/m$^2$ or higher but no higher than 15 g/m$^2$ based on dry weight. If the coating weight is under 3 g/m$^2$, the sealing effect may not be sufficient. If the coating weight exceeds 15 g/m$^2$, on the other hand, the drying load increases at the time of coating, which is not desirable from the viewpoints of both operation and cost.

Preferably the coating weight of the gas barrier layer is 0.2 g/m$^2$ or higher but no higher than 20 g/m$^2$ based on dry weight. If the coating weight of the gas barrier layer is under 0.2 g/m$^2$, forming a uniform gas barrier layer becomes difficult and therefore sufficient gas barrier property may not be obtained. If the coating weight exceeds 20 g/m$^2$, on the other hand, the drying load increases at the time of coating, which is not desirable from the viewpoints of both operation and cost.

EXAMPLES

The present invention is explained below using examples; however, the present invention is not limited to the following examples. It should be noted that, unless otherwise specified, in the examples, "part" and "percent" represent "part by weight" and "percent by weight" based on solids content, respectively.

(Evaluation Methods)
(1) Air Permeation Resistance

The air permeation resistance of the laminate consisting only of the paper base material and pigment coating layer was measured based on JAPAN TAPPI No. 5-2: 2000.

(2) Surface Roughness

The surface roughness of the laminate consisting only of the paper base material and pigment coating layer was measured based on JIS P8151: 2004 using a soft backing under a condition of 1 MPa in clamping pressure.

(3) Oxygen Permeability (Gas Barrier Property)

The oxygen permeability (gas barrier property) of the paper barrier material was measured using the OX-TRAN2/21 manufactured by MOCON, Inc. under a condition of 23° C.-0% RH.

(4) Intralaminar and Interlaminar Fractures Under Rapid Heating

The paper barrier material was cut to 40 mm long×40 mm wide, which was then rapidly heated by blowing hot air of approx. 500° C. to the gas barrier layer side using a heat gun (PJ214A, manufactured by Ishizaki Electric Mfg. Co., Ltd.), wherein intralaminar and interlaminar fractures or lack thereof were visually checked.

◯: Intralaminar and interlaminar fractures do not occur.

×: Intralaminar and interlaminar fractures occur.

(Preparation of Coating Solution for Pigment Coating Layer)

Compounds based on the following formulations were dispersed under agitation to prepare coating solutions for pigment coating layer 1 to 6.

<Coating Solution for Pigment Coating Layer 1>

| | |
|---|---|
| Ground calcium carbonate (FMT-90, manufactured by FIMATEC Ltd.) | 100.0 parts |
| Oxidized starch (Mermaid M210, manufactured by Shikishima Starch Mfg. Co., Ltd.) | 4.5 parts |
| Styrene-butadiene-based copolymer latex (PNT8110, manufactured by Zeon Corporation) | 8.5 parts |
| Water | 60.8 parts |

<Coating Solution for Pigment Coating Layer 2>

| | |
|---|---|
| Ground calcium carbonate (FMT-90, manufactured by FIMATEC Ltd.) | 20.0 parts |
| Fine-particle kaolin (Hydragloss, manufactured by KaMin LLC) | 80.0 parts |
| Oxidized starch (Mermaid M210, manufactured by Shikishima Starch Mfg. Co., Ltd.) | 4.5 parts |
| Styrene-butadiene-based copolymer latex (PNT8110, manufactured by Zeon Corporation) | 8.5 parts |
| Water | 60.8 parts |

<Coating Solution for Pigment Coating Layer 3>

| | |
|---|---|
| Ground calcium carbonate (FMT-90, manufactured by FIMATEC Ltd.) | 90.0 parts |
| Synthetic amorphous silica (BS-308N, manufactured by DSL. Japan Co., Ltd.) | 10.0 parts |
| Oxidized starch (Mermaid M210, manufactured by Shikishima Starch Mfg. Co., Ltd.) | 4.5 parts |
| Styrene-butadiene-based copolymer latex (PNT8110, manufactured by Zeon Corporation) | 9.5 parts |
| Water | 60.8 parts |

<Coating Solution for Pigment Coating Layer 4>

| | |
|---|---|
| Ground calcium carbonate (FMT-90, manufactured by FIMATEC Ltd.) | 20.0 parts |
| Fine-particle kaolin (Hydragloss, manufactured by KaMin LLC) | 80.0 parts |
| Oxidized starch (Mermaid M210, manufactured by Shikishima Starch Mfg. Co., Ltd.) | 2.0 parts |
| Styrene-butadiene-based copolymer latex (PNT8110, manufactured by Zeon Corporation) | 20.0 parts |
| Water | 60.8 parts |

<Coating Solution for Pigment Coating Layer 5>

| | |
|---|---|
| Ground calcium carbonate (FMT-90, manufactured by FIMATEC Ltd.) | 20.0 parts |
| Fine-particle kaolin (Hydragloss, manufactured by KaMin LLC) | 80.0 parts |
| Oxidized starch (Mermaid M210, manufactured by Shikishima Starch Mfg. Co., Ltd.) | 2.0 parts |
| Styrene-butadiene-based copolymer latex (PNT8110, manufactured by Zeon Corporation) | 18.0 parts |
| Water | 60.8 parts |

<Coating Solution for Pigment Coating Layer 6>

| | |
|---|---|
| Fine-particle kaolin (Hydragloss, manufactured by KaMin LLC) | 100.0 parts |
| Oxidized starch (Mermaid M210, manufactured by Shikishima Starch Mfg. Co., Ltd.) | 2.0 parts |
| Styrene-butadiene-based copolymer latex (PNT8110, manufactured by Zeon Corporation) | 20.0 parts |
| Water | 60.0 parts |

(Preparation of Coating Solution for Seal Layer 1)
A compound based on the following formulation was dispersed under agitation to prepare a coating solution for seal layer 1.
<Coating Solution for Seal Layer 1>

| | |
|---|---|
| Fine-particle kaolin (Hydragloss, manufactured by KaMin LLC) | 60.0 parts |
| Engineered kaolin (Capim DG, manufactured by IMERYS S.A.) | 20.0 parts |
| Sodium polyacrylate | 0.5 parts |
| Ground calcium carbonate (FMT-90, manufactured by FIMATEC Ltd.) | 20.0 parts |
| Styrene-butadiene-based copolymer latex (PNT8110, manufactured by Zeon Corporation) | 20.0 parts |
| Oxidized starch (Mermaid M210, manufactured by Shikishima Starch Mfg. Co., Ltd.) | 2.0 parts |
| Water | 71.7 parts |

(Preparation of Coating Solution for Seal Layer 2)
A compound based on the following formulation was dispersed under agitation to prepare a coating solution for seal layer 2.
<Coating Solution for Seal Layer 2>

| | |
|---|---|
| Engineered kaolin (Barrisurf HX, manufactured by IMERYS S.A.) | 100.0 parts |
| Styrene-butadiene-based copolymer latex (PNT8110, manufactured by Zeon Corporation) | 50.0 parts |
| Water | 71.7 parts |

(Preparation of Coating Solution for Gas Barrier Layer)
A compound based on the following formulation was dispersed under agitation to prepare a coating solution for gas barrier layer.

<Coating Solution for Gas Barrier Layer>

| | |
|---|---|
| Engineered kaolin (Barrisurf HX, manufactured by IMERYS S.A.) | 100.0 parts |
| Sodium polyacrylate | 0.2 parts |
| Polyvinyl alcohol (PVA117, manufactured by Kuraray Co., Ltd.) | 100.0 parts |
| Water | 1801.8 parts |

Example 1

The coating solution for pigment coating layer 1 was coated on one side of a base paper material (body paper for paper container with a basis weight of 280 $g/m^2$, triple-layered product) to a coating weight of 6.0 $g/m^2$ based on dry weight according to the blade method, and then dried, to obtain a laminate. The air permeation resistance of this laminate, as measured based on JAPAN TAPPI No. 5-2: 2000, was 1,600 seconds.

Next, the coating solution for seal layer 1 was coated on the side of this laminate opposite the pigment coating layer, to a coating weight of 6.0 $g/m^2$ based on dry weight according to the blade method, and then dried, after which the coating solution for gas barrier layer was coated on top to a coating weight of 3.0 $g/m^2$ based on dry weight according to the air-knife method, and then dried, followed by soft nip calendaring under a condition of 60 kN/m in line pressure, to obtain a paper barrier material.

Example 2

A paper barrier material was obtained in the same manner as in Example 1, except that the coating solution for pigment coating layer 1 was coated to a coating weight of 12.0 $g/m^2$ based on dry weight according to the blade method, and then dried, to obtain a laminate. The air permeation resistance of this laminate, as measured based on JAPAN TAPPI No. 5-2: 2000, was 2,100 seconds.

Example 3

A paper barrier material was obtained in the same manner as in Example 1, except that the coating solution for pigment coating layer 2, instead of the coating solution for pigment coating layer 1, was coated to a coating weight of 5.0 $g/m^2$ based on dry weight according to the blade method, and then dried, to obtain a laminate. The air permeation resistance of this laminate, as measured based on JAPAN TAPPI No. 5-2: 2000, was 2,300 seconds.

Example 4

A paper barrier material was obtained in the same manner as in Example 1, except that the coating solution for pigment coating layer 3, instead of the coating solution for pigment coating layer 1, was coated to a coating weight of 6.0 $g/m^2$ based on dry weight according to the blade method, and then dried, to obtain a laminate. The air permeation resistance of this laminate, as measured based on JAPAN TAPPI No. 5-2: 2000, was 1,100 seconds.

Example 5

Using a paper base material (basis weight 42 $g/m^2$, single-layer product), the coating solution for pigment coating layer 6 was coated on it to a coating weight of 6.0 $g/m^2$ in dry weight according to the blade method, and then dried, to obtain a laminate. The air permeation resistance of this laminate, as measured based on JAPAN TAPPI No. 5-2: 2000, was 400 seconds.

Next, the coating solution for seal layer 2 was coated on the side of this laminate opposite the pigment coating layer, to a coating weight of 10.0 g/m² based on dry weight according to the curtain method, and then dried, after which the coating solution for the gas barrier layer was coated on top to a coating weight of 3.0 g/m² based on dry weight according to the air-knife method, and then dried, followed by soft nip calendaring under a condition of 60 kN/m in line pressure, to obtain a paper barrier material.

Comparative Example 1

A paper barrier material was obtained in the same manner as in Example 1, except that the coating solution for pigment coating layer 4, instead of the coating solution for pigment coating layer 1, was coated to a coating weight of 10.0 g/m² based on dry weight according to the blade method, and then dried, to obtain a laminate. The air permeation resistance of this laminate, as measured based on JAPAN TAPPI No. 5-2: 2000, was 6,000 seconds.

Comparative Example 2

A paper barrier material was obtained in the same manner as in Example 1, except that the coating solution for pigment coating layer 5, instead of the coating solution for pigment coating layer 1, was coated to a coating weight of 8.0 g/m² based on dry weight according to the blade method, and then dried, to obtain a laminate. The air permeation resistance of this laminate, as measured based on JAPAN TAPPI No. 5-2: 2000, was 4,000 seconds.

The evaluation results of the laminates and paper barrier materials obtained by the respective Examples and Comparative Examples are shown in Table 1.

ation resistance higher than 2,500 seconds, and therefore fractures occurred under rapid heating due to water vapor generating inside.

What is claimed is:

1. A paper barrier material comprising:
a laminate consisting of a paper base material and a pigment coating layer wherein the laminate has an air permeation resistance of 2,500 seconds or lower as measured based on JAPAN TAPPI No. 5-2: 2000, said paper base material having a first principal face on a side opposite a side of the pigment coating layer, and said pigment coating layer having a second principal face on a side opposite the paper base material;
a seal layer provided on the first principal face; and
a gas barrier layer provided on the seal layer such that the seal layer is interposed between the gas barrier layer and the paper base material, wherein the gas barrier layer has gas barrier property and is comprised of a water-soluble polymer, wherein the seal layer is comprised of a pigment and a binder so as to block a coating solution for forming the gas barrier layer from being absorbed into laminate through the first principal face when the gas barrier layer is formed,
wherein the paper barrier material further comprises a heat-sealing layer for shaping the paper barrier material in a desired shape by heat-sealing, which is a layer of a thermoplastic resin provided as an outermost layer of the paper barrier material in a thickness direction.

2. The paper barrier material according to claim 1, wherein the laminate consisting of the paper base material and pigment coating layer has a surface roughness, as measured based on JIS P8151:2004 using a soft backing under a condition of 1 MPa in clamping pressure, of 3.5 μm or lower.

TABLE 1

| | | | | | Example 1 | Example 2 | Example 3 | Example 4 | Example 5 | Comparative Example 1 | Comparative Example 2 |
|---|---|---|---|---|---|---|---|---|---|---|---|
| Laminate | Pigment coating layer | Pigment | Calcium carbonate | parts | 100 | 100 | 20 | 90 | — | 20 | 20 |
| | | | Kaolin | parts | — | — | 80 | — | 100 | 80 | 80 |
| | | | Silica | parts | — | — | — | 10 | — | — | — |
| | | Binder | Starch | parts | 4.5 | 4.5 | 4.5 | 4.5 | 2 | 2 | 2 |
| | | | Styrene-butadiene copolymer | parts | 8.5 | 8.5 | 8.5 | 9.5 | 20 | 20 | 18 |
| | | Coating weight | | g/m² | 6.0 | 12.0 | 5.0 | 6.0 | 6.0 | 10.0 | 8.0 |
| | | Air permeation resistance | | seconds | 1600 | 2100 | 2300 | 1100 | 400 | 6000 | 4000 |
| | | Surface roughness | | μm | 3.0 | 3.5 | 3.0 | 3.5 | 2.0 | 2.0 | 2.5 |
| Paper barrier material | Quality evaluations | Oxygen permeation (gas barrier property) | | ml/m²·day | 3 | 3 | 3 | 3 | 3 | 3 | 3 |
| | | Fractures under rapid heating | | | ○ | ○ | ○ | ○ | ○ | X | X |

With the paper barrier materials obtained by Examples 1 to 5 conforming to the present invention, the laminate consisting only of the paper base material and pigment coating layer had a low air permeation resistance of 2,500 seconds or lower and thus allowed gases to escape easily, and consequently fractures did not occur under rapid heating.

With the paper barrier materials obtained by Comparative Examples 1 and 2, the laminate consisting only of the paper base material and pigment coating layer had an air perme- 3. The paper barrier material according to claim 1, wherein the pigment coating layer is constituted by an inorganic pigment and a binder as primary components, wherein a mixing ratio of the inorganic pigment to the binder is in a range of 90/10 to 80/20 by mass in the pigment coating layer.

4. The paper barrier material according to claim 1, wherein the heat-sealing layer consists of the thermoplastic resin.

\* \* \* \* \*